United States Patent Office 3,557,227
Patented Jan. 19, 1971

3,557,227
**METHOD OF PRODUCING 1,2,4,5-TETRA-
CHLOROBENZENE**
Mike M. Fooladi, Atlanta, Ga., assignor to Sonford Chemical Company, Port Neches, Tex., a corporation of Illinois
No Drawing. Filed Dec. 10, 1968, Ser. No. 782,724
Int. Cl. C07c 25/00, 25/02
U.S. Cl. 260—650
1 Claim

ABSTRACT OF THE DISCLOSURE 1,2,4,5-tetrachlorobenzene is produced by chlorinating lower chlorinated benzenes or benzene in the presence of iodine and antimony trichloride.

BACKGROUND OF THE INVENTION

When the chlorination of benzene is carried to the tetrachloro stage, the principal products are 1,2,4,5-tetrachlorobenzene and 1,2,3,4-tetrachlorobenzene. Of these two products, 1,2,4,5-tetrachlorobenzene is by far the more useful commercially.

The formation of a substantial proportion of 1,2,3,4-tetrachlorobenzene in the chlorination of benzene to the tetrachloro stage is undesirable not only because of the low economic value of that product, but also because the presence of a substantial proportion of that product makes it very difficult to separate the more valuable 1,2,4,5-tetrachlorobenzene.

In the known methods of chlorinating benzene to the tetrachloro stage it has not been possible to avoid the production of a substantial proportion of 1,2,3,4-tetrachlorobenzene, and a number of elaborate processes for separating 1,2,4,5-tetrachlorobenzene from 1,2,3,4-tetrachlorobenzene have been developed and patented during the past fifteen years.

In the conventional method of manufacturing 1,2,4,5-tetrachlorobenzene, which has been used commercially for a number of years, chlorine gas is bubbled into benzene in the presence of ferric chloride as a catalyst. Hydrogen chloride is formed and is eliminated as the reaction proceeds. Metallic iron may be added instead of ferric chloride, because it reacts with hydrogen chloride to produce ferric chloride.

Canadian Pat. No. 706,925, granted to Hooker Chemical Corporation on Mar. 30, 1965, discloses that in the conventional method of manufacturing 1,2,4,5-tetrachlorobenzene the yield of the product can be increased somewhat by adding a sulfur chloride. However, the sulfur chloride thus introduced into the product is an impurity which must be removed, for example by a fractional distillation step. This fractional distillation step is in addition to the step of removing the conventional ferric chloride catalyst from the reaction product. The step of removing the ferric chloride catalyst, which is necessary because of the dark color imparted to the product by the ferric chloride, usually consists in heating to about 150° C. to fuse the product, agitating the molten product with a small amount of calcium hydroxide and diatomaceous earth, and filtering the product while still molten.

Table I below, which is taken from Examples 16 and 17 of Canadian Pat. No. 706,925 of Hooker Chemical Corporation, shows the yields of 1,2,4,5-tetrachlorobenzene and 1,2,3,4-tetrachlorobenzene in the crude product obtained by the conventional process in which ferric chloride is used as the catalyst, and in the crude product obtained by a process in which sulfur monochloride is used in addition to the ferric chloride catalyst.

TABLE I

| Catalyst | Percent yield in crude reaction product | |
|---|---|---|
| | 1,2,4,5-tetrachlorobenzene | 1,2,3,4-tetrachlorobenzene |
| FeCl₃ | 31.8 | 26.7 |
| FeCl₃+S₂Cl₂ | 34.8 | 20.4 |

SUMMARY OF THE INVENTION

For comparison with the results obtained in the known processes, shown in Table I, the results obtained in the practice of the present process, according to Example 1, are shown in Table II below:

TABLE II

| Catalyst | Percent yield in filtrate from crude reaction product | |
|---|---|---|
| | 1,2,4,5-tetrachlorobenzene | 1,2,3,4-tetrachlorobenzene |
| I₂+SbCl₃ | 70.3 | 7.2 |

The results obtained by the present method, which are shown in Table II, are so vastly superior to the results obtained by the known methods, which are shown in Table I, that the present invention may be properly described as a breakthrough in the art of manufacturing 1,2,4,5-tetrachlorobenzene.

An important advantage of the present method is that the crude product, because of the large proportion of 1,2,4,5-tetrachlorobenzene and the small proportion of 1,2,3,4-tetrachlorobenzene, is much easier to purify than the crude product obtained by the known methods. Thus the crude solid product obtained by filtering the solid material from the slurry produced by the present method in accordance with Example 1 below contains a 70.3% yield of 1,2,4,5-tetrachlorobenzene and a 7.2% yield of 1,2,3,4-tetrachlorobenzene. When this crude solid product is washed with a small amount of cold methanol, the methanol dissolves nearly all of the 1,2,3,4-tetrachlorobenzene while dissolving only a small proportion of the 1,2,4,5-tetrachlorobenzene. In contrast, the reaction produced by the known methods contain a relatively high proportion of 1,2,3,4-tetrachlorobenzene, so that the 1,2,4,5-tetrachlorobenzene cannot be separated from such reaction products by merely filtering and washing, and must be separated by elaborate procedures, usually involving fractional crystallization.

Another very important advantage of the present method of producing 1,2,4,5-tetrachlorobenzene from benzene is that the present process takes only about three hours, as compared with the known methods of producing 1,2,4,5-tetrachlorobenzene from benzene, which require from 15 to 30 hours.

The results shown in the above Tables I and II may be compared directly because in each of the runs included in the two tables, chlorine was bubbled into the benzene in the presence of the catalyst or catalysts listed in the tables. Of course the results obtained in a run in which the starting material is benzene cannot be compared directly with the results obtained in a run in which the starting material is an intermediate chlorination product of benzene.

Also it should be pointed out that the percentages listed in the above Table I constitute the percent yields in the crude product which remained at the end of the chlorination reaction, while the percentages listed in the above Table II constitute the percent yields in the solid product which was filtered from the crude reaction product. In each case the percent yield is the percent of the original charge of benzene which has been converted into the amount of 1,2,4,5-tetrachlorobenzene or 1,2,3,4-tetrachlorobenzene found in the particular crude product. These percent yields should be distinguished from percentages which merely show the composition of a reaction product or the composition of a partially separated or partially purified product.

Antimony trichloride is known to act as a catalyst in the chlorination of benzene. However, antimony trichloride is not used commercially in the production of 1,2,4,5-tetrachlorobenzene by chlorination of benzene, because it gives relatively poor yields.

It is known that iodine acts as a catalyst in the chlorination of benzene, but it is also well known that iodine is a very unsatisfactory catalyst for the chlorination of benzene in that its catalytic action is very transitory. When chlorine is bubbled into benzene in the presence of iodine, there is catalytic action, evidenced by a rise in temperature, but the catalytic action of the iodine immediately ceases.

Thus it has been found that when iodine alone in used as a catalyst in the chlorination of benzene, the addition of iodine must be continued throughout the reaction because the catalytic action of the iodine stops shortly after each addition of iodine. Even when iodine is added constantly during the chlorination of benzene, the chlorination reaction is very slow and unsatisfactory.

The present invention is based upon the discovery that iodine is a very active catalyst for the chlorination of benzene, and gives excellent yields of 1,2,4,5-tetrachlorobenzene as hereinbefore described, provided that the iodine is used in combination with antimony trichloride.

DESCRIPTION OF THE PREFERRED EMBODIMENTS

In the practice of the present method, the chlorination is carried out in the conventional manner, except that iodine and antimony trichloride are used instead of the conventional ferric chloride catalyst, and the reaction proceeds much faster and gives a much better yield of 1,2,4,5-tetrachlorobenzene.

The starting material to be chlorinated may consist of benzene, chlorobenzene, a dichlorobenzene, a trichlorobenzene, or any mixture of such substances. The starting material in a commercial process usually is a mixture, because it includes lower chlorinated benzenes which have been removed from the crude product and returned to the chlorination reactor.

In the conventional procedure for chlorinating benzene, which may be followed in the present method, chlorine gas is bubbled into the starting material to be chlorinated. Customarily, the starting material is warmed to expedite the reaction, and the chlorination is carried out at atmospheric pressure. If the starting material contains benzene, the temperature is maintained below the boiling point of benzene initially, to prevent violent boiling of the benzene. Then when the benzene has been substantially converted to dichlorobenzenes, the temperature can be raised above the melting point of p-dichlorobenzene to prevent that substance from separating in the form of a solid.

In the manufacture of 1,2,4,5-tetrachlorobenzene by chlorination, it is customary to limit the temperature to about 100° C. in order to obtain a maximum yield of the product, although the temperature may be allowed to rise as high as 120° C. for a brief period of a few minutes. However, in the practice of the present invention the reaction takes place much more rapidly than in the methods heretofore known, so that the temperature in the present method may be held to a maximum of 60 to 80° C. without unduly slowing the reaction.

The present method may be conducted as a batch process or a continuous process. The present method lends itself to the use of a continuous process because of the remarkably rapid rate at which the reaction takes place. In a continuous process, the starting material to be chlorinated, containing the iodine and antimony trichloride, is introduced at the top of a vertical column and the chlorine gas is introduced at the bottom of the column. The rate at which the starting material is introduced at the top of the column is such that the product drawn off at the bottom of the column is chlorinated to the proper stage.

In accordance with conventional chlorination procedure, the hydrogen chloride formed in the reaction is allowed to escape from the reaction and may be recovered as a by-product, and the chlorine gas is introduced at a rate slow enough so that the hydrogen chloride gas which escapes from the reactor does not contain an appreciable amount of free chlorine. However, free chlorine may appear in the escaping hydrogen chloride near the end of the process and may be taken as an indication that the reaction is nearing completion.

In a large reactor used for the production of 1,2,4,5-tetrachlorobenzene, agitation may be employed to insure the distribution of the bubbles of chlorine gas throughout the reaction mixture, particularly during the latter stages of the reaction after the product has precipitated to produce a slurry. If desired, the precipitated products may be redissolved at the end of the reaction by heating the reaction mixture to a temperature between 120 and 130° C. to facilitate transfer of the reaction products from the reaction zone.

Both iodine and antimony trichloride must be present in the method of the present invention. It is believed that the outstanding improvement in results obtained in the practice of the present invention is due to the action of iodine in the presence of antimony trichloride.

Heretofore, whenever an attempt has been made to use iodine as a catalyst in the chlorination of benzene, the catalytic action of iodine has been found to be evanescent, and it has been necessary to add more iodine constantly as the chlorination proceeds. However, when iodine is used in the presence of antimony trichloride, in the practice of the present method, the catalystic action is extremely strong and persistent, and thus is entirely different from the catalytic action of iodine in the absence of antimony trichloride.

Although both iodine and antimony trichloride must be present in the practice of the present method, no minimum amounts of these catalysts can be prescribed. The chlorination of benzene proceeds even in the absence of any catalyst, and the presence of any appreciable amounts of iodine and antimony trichloride has a beneficial effect upon the reaction.

Thus the amount of antimony trichloride used in the present method is not critical. For best results, however, it is preferable that the amount of antimony trichloride be at least 0.1% by weight of the amount of the starting material which is to be chlorinated.

The upper limit of the amount of antimony trichloride used is not critical. Thus the amount of antimony trichloride may be as much as 5% by weight of the amount of the starting material to be chlorinated. However, the use of such a large amount of antimony trichloride is wasteful, and ordinarily there is no advantage in using an amount of antimony trichloride which is more than 1% by weight of the amount of the starting material to be chlorinated.

Also, there is no advantage in using an amount by weight of antimony trichloride which is greater than the weight of iodine used. In fact, it has been found that the amount of antimony trichloride is adequate to trigger the catalytic action of the iodine when the weight of antimony trichloride used is one half the weight of iodine used.

Although any appreciable amount of iodine, in the presence of antimony trichloride, produces a substantial improvement in results, for good results it is preferable that the amount of iodine used be at least 0.1% by weight of the amount of the starting material to be chlorinated.

The maximum amount of iodine which it is desirable to use depends upon the amount of antimony trichloride present.

For example, if benzene to be chlorinated by the present method contains 0.2% of antimony trichloride, the presence of 0.4% of iodine produces good results, but the presence of 1.0% of iodine with 0.2% of antimony trichloride produces a much more sluggish reaction and a lower yield of 1,2,4,5-tetrachlorobenzene. Evidently the amount of antimony trichloride present in this case is not sufficient to trigger five times its weight of iodine, so that the excess of iodine catalyst has a self-poisoning effect, similar to the effect which is known to occur when iodine is used as a catalyst without any antimony trichloride.

When benzene to be chlorinated in the present method contains 1.0% of its weight of iodine, the presence of an amount of antimony trichloride equal to one fifth of the weight of iodine produces only a sluggish reaction, as above described, but the presence of an amount of antimony trichloride equal to one half of the weight of iodine triggers the catalytic action of the iodine so as to produce a very strong and sustained catalytic action and a very rapid reaction of the chlorine with the benzene.

In order to produce the best catalytic action and to avoid wasting iodine, the weight of iodine used in the present method preferably is not more than three times the weight of antimony trichloride. Excellent results can be obtained by using an amount of iodine which is approximately twice the weight of antimony trichloride.

When the weight of antimony trichloride is at least one half of the weight of iodine present, best results can be obtained by using an amount of iodine which is at least 0.5% by weight of the amount of the starting material to be chlorinated.

When the weight of antimony trichloride is at least one half the weight of iodine used, the speed of the reaction increases as the amount of iodine is increased, and the exothermic reaction becomes difficult to control in a batch process when the amount of iodine is more than 1.0% by weight of the amount of starting material to be chlorinated, particularly when the starting material contains a substantial proportion of benzene. When the weight of antimony trichloride is at least half the weight of iodine used, the upper limit of the amount of iodine depends upon the speed of reaction desired, and may be 2 to 3% if the reaction is conducted as a continuous process or if the starting material is relatively highly chlorinated and there is an efficient arrangement for cooling the reaction mixture.

Ordinarily it is most convenient to add all of the catalysts at the beginning of the chlorination reaction. However, if it is desired to use a relatively large amount of catalysts in order to speed up the reaction, the iodine and antimony trichloride may be added in increments to make it easier to control the exothermic reaction.

Antimony trichloride is colorless, so that the slight residue of antimony trichloride in the product obtained by the present method is usually not objectionable, in contrast to the ferric chloride heretofore used in the chlorination of benzene, which is dark-colored.

Also, antimony trichloride is extremely soluble so that the residue of antimony trichloride in the product is substantially removed when the product is washed to extract other impurities.

The residue of iodine in the product obtained by the present method imparts a slight pink tinge to the product, but the iodine is removed in the customary washing operation. Also, the iodine disappears by evaporation after the product has been exposed to the atmosphere for about two hours.

Example 1

A three-neck flask equipped with a reflux condenser, thermometer and gas distributing tube for introduction of chlorine was charged with 575 grams of benzene, 4.3 grams of iodine and 2.2 grams of antimony trichloride, and chlorine was fed through the tube at a rate slow enough to prevent free chlorine from escaping from the reflux condenser. During the introduction of the chlorine the exterior of the flask was cooled with water to maintain the temperature in the flask between 35 and 45° C. for thirty minutes, then between 45 and 50° C. for thirty minutes, and then between 75 and 90° C. for two hours. After chlorine had been introduced for a period of three hours, the reaction mixture was transferred to a beaker which was then chilled to promote precipitation of solid material. The crude solid product, which was substantially white in color, was then filtered from the mother liquor. After being spread out and allowed to dry in the air, the solid product was found to weigh 1,270 grams and to have a melting point of 127° C. The composition of this crude solid product is shown in Table III below. After being washed once with cold methanol and dried in the air, the product weighed 1,100 grams and had a melting point of 138–140° C., and was found to contain 98.5% by weight of 1,2,4,5-tetrachlorobenzene, corresponding to 69% of the theoretical yield which would have been produced by complete conversion of the benzene starting material to 1,2,4,5-tetrachlorobenzene.

Examples 2–4

The procedure of Example 1 was repeated three times, the amount of the benzene starting material being increased in each case, and the amounts of the catalysts being increased proportionately. The composition of the dried crude solid product in each case is shown in Table III below.

TABLE III

| Starting material (grams) | Ex. 1 | Ex. 2 | Ex. 3 | Ex. 4 |
|---|---|---|---|---|
| Benzene | 575 | 1,000 | 1,522 | 3,410 |
| Composition of crude solid product (percent by weight): | | | | |
| 1,2,4-trichlorobenzene | 0.75 | 1.0 | 1.5 | 0.1 |
| 1,2,3,4-tetrachlorobenzene | 9.0 | 8.0 | 6.0 | 5.5 |
| 1,2,4,5-tetrachlorobenzene | 88.0 | 90.0 | 91.5 | 93.0 |

Example 5

The procedure of Example 1 was repeated, the amount of benzene starting material being reduced to 300 grams, and the percent by weight of each of the two catalysts (calculated as percent of the weight of benzene) being only half of the percent by weight of each catalyst in Example 1. Chlorine was introduced at a constant rate for a period of five hours, the total amount of chlorine introduced being 5.2 moles for each mole of benzene starting material. The temperature was 30° C. at the start and was allowed to rise to 60° C. during the first hour and then to about 65° C. during the next three hours. During the fifth hour, the temperature fell from about 65° to about 60°. Samples were removed from the reaction mixture and analyzed from time to time. During the first hour, the benzene substantially disappeared and the chlorobenzene reached a peak. The paradichlorobenzene reached a peak in about two hours. The 1,2,4-trichlorobenzene reached a peak in about three hours, and had fallen to 17.5% at the end of five hours. The concentration of 1,2,4,5-tetrachlorobenzene increased rather steadily to a final value of 56% during the last three hours, but the concentration of 1,2,3,4-tetrachlorobenzene leveled off at 22% during the last hour. The pentachlorobenzene attained a concentration of 3% at the end of five hours.

The total amount of catalysts used in Examples 1–4 was approximately 1% of the weight of benzene, whereas the total amount of catalysts used in Example 5 was only about 0.5% of the weight of benzene. The results obtained in Example 5, because of the smaller amount of catalysts used, were inferior to the results obtained in Examples 1–4. Yet the results obtained in Example 5 were still much better than the results which can be obtained by known methods.

Example 6

(a) The procedure of Example 1 was repeated, using reduced amounts of catalysts, similar to the amounts of catalysts used in Example 5. In this case the initial charge consisted of 760 grams of benzene, 2.5 grams of iodine and 1.3 grams of antimony trichloride. Chlorine was introduced for a period of nine hours, while the temperature of the reaction mixture was maintained in the range of 45–85° C. The resulting slurry, upon filtration, yielded 600 grams of mother liquor, and a solid white product which when dried weighed 1,120 grams and had a melting point of 133–137° C. This product was found to contain 94% by weight of 1,2,4,5-tetrachlorobenzene. Washing once with cold methanol yielded 1,000 grams of a product having a melting point of 141–143° C. which was found to contain 99.5% by weight of 1,2,4,5-tetrachlorobenzene, representing 47.2% of the maximum theoretical yield from the benzene starting material. This yield of 47.2% compares with the 69% yield obtained in Example 1. The less desirable results obtained in Example 5 and in the present Example 6 are due to the fact that the amounts of the catalysts used in Examples 5 and 6 were only about one half the amounts of catalysts used in Example 1, expressed in percent by weight of the amount of benzene starting material.

(b) For purposes of comparison, the procedure of Example 1 was repeated, using 840 grams of benzene as the starting material, together with 5 grams of antimony trichloride and no other catalyst. Chlorine was introduced during a period of ten hours, the temperature being maintained between 35 and 45° C. for the first three hours, between 45 and 60° C. for the next four hours, and between 60 and 80° C. for the last three hours. Chilling and filtering the reaction product gave a white solid which, after being dried, was found to weigh 850 grams and to have a melting point of 110–122° C. This white solid contained 78% by weight of 1,2,4,5-tetrachlorobenzene, representing a 28.6% yield. One washing with cold methanol, followed by drying in the air, yielded a final product weighing 600 grams and having a melting point of 137–139° C. This final product was found to contain 96% by weight of 1,2,4,5-tetrachlorobenzene, representing 26% of the theoretical yield from the benzene starting material. This demonstrates that the improved results obtained in the practice of the present invention are not obtained if the iodine is omitted.

Example 7

The procedure of Example 1 was repeated, using 775 grams of chlorobenzene as the starting material, together with 3 grams of iodine and 5 grams of antimony trichloride. Chlorine was introduced during a period of eight hours, the temperature being maintained between 45 and 55° C. for two hours, and between 55 and 85° C. for the next six hours. The crude white solid obtained by filtering the reaction product, after being dried in the air, weighed 800 grams, and was found to contain 90% by weight of 1,2,4,5-tetrachlorobenzene and to have a melting point of 119–126° C. One washing with cold methanol, followed by drying in air, yielded a final product weighing 692 grams, which was found to have a melting point of 138–139° C., and to contain 95–97% by weight of 1,2,4,5-tetrachlorobenzene, corresponding to 46% of the theoretical yield from the amount of chlorobenzene used as a starting material. The yield obtained in the present example is similar to the yield obtained in Example 6(a), and the proportion of iodine used in the present example also is similar to the proportion of iodine used in Example 6(a) and is only about one half the proportion of iodine used in the preceding Examples 1–4. In the present example, however, the weight of antimony trichloride used was substantially more than the weight of iodine, whereas in Example 6(a) the weight of antimony trichloride used was only one half of the weight of iodine. The increased amount of antimony trichloride employed in the present example did not appear to improve the yield as compared with the yield obtained in Example 6(a), and it is not believed to be necessary to use an amount of antimony trichloride which is more than one half of the weight of iodine.

What I claim is:

1. In a method of producing 1,2,4,5-tetrachlorobenzene by chlorinating a substance selected from the group consisting of chlorobenzene, dichlorobenzenes, trichlorobenzenes, benzene and mixtures of such substances, wherein the improvement comprises carrying out the chlorination in the presence of iodine and antimony trichloride.

References Cited

UNITED STATES PATENTS

| 1,956,040 | 2/1934 | Stoesser et al. | 210—650X |
| 2,707,197 | 4/1955 | Souillard | 260—650UX |
| 3,226,447 | 12/1965 | Bing et al. | 260—630 |

FOREIGN PATENTS

| 706,925 | 3/1965 | Canada | 260—632 |

HOWARD T. MARS, Primary Examiner